Aug. 24, 1948.  W. C. MORAN  2,447,767
INDICATOR FOR IMPACT TESTING MACHINES
Filed Nov. 29, 1945  2 Sheets-Sheet 2

INVENTOR.
William C. Moran
by
Herbert S. Fairbanks
ATTORNEY.

Patented Aug. 24, 1948

2,447,767

UNITED STATES PATENT OFFICE 2,447,767

INDICATOR FOR IMPACT TESTING MACHINES

William C. Moran, Laurel Springs, N. J., assignor to Tinius Olsen Testing Machine Company, Philadelphia, Pa., a corporation of Pennsylvania Application November 29, 1945, Serial No. 631,593

11 Claims. (Cl. 73—12)

1

The object of this invention is to devise a novel indicating mechanism for impact testing machines of the impact type.

It is desirable that indicating mechanisms of this type have the following characteristics:

1. They should indicate the energy consumed in the breaking of the specimen.
2. They should remain in indicating position until the reading is taken.
3. The inertia effect should be minimum.
4. The friction should be minimum.
5. A straight line reading with equally spaced graduations should be used for convenience in reading and for reduction in the cost of manufacture.
6. The indicator should return to its starting position after a test is made and the reading taken.

With the foregoing and other objects in view as will hereinafter clearly appear, my invention comprehends a novel indicating mechanism for impact testing machines.

For the purpose of illustrating the invention, I have shown in the accompanying drawings a preferred embodiment of it which I have found in practice to give satisfactory and reliable results. It is, however, to be understood that the various instrumentalities of which the invention consists can be variously arranged and organized, and the invention is not limited to the exact arrangement and organization of these instrumentalities as herein set forth.

Figure 6 is a section showing more particularly a spring pressed plunger for retaining a scale bar in its adjusted position.

Similar numerals of reference indicate corresponding parts.

Figure 1:
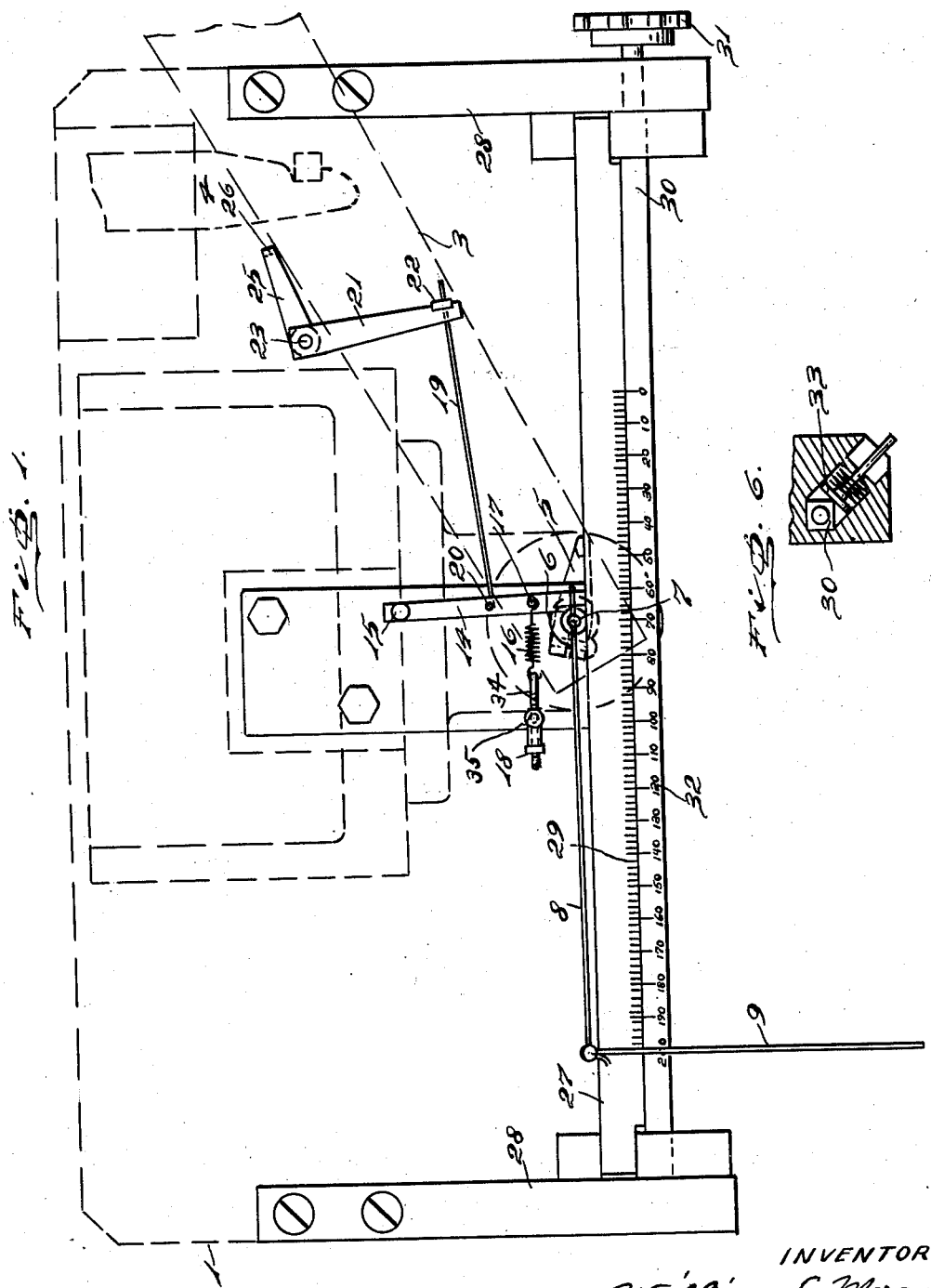
Figure 1 is a front elevation of a portion of an impact tester, in conjunction with which an indicating mechanism embodying my invention is employed.
Figure 2:
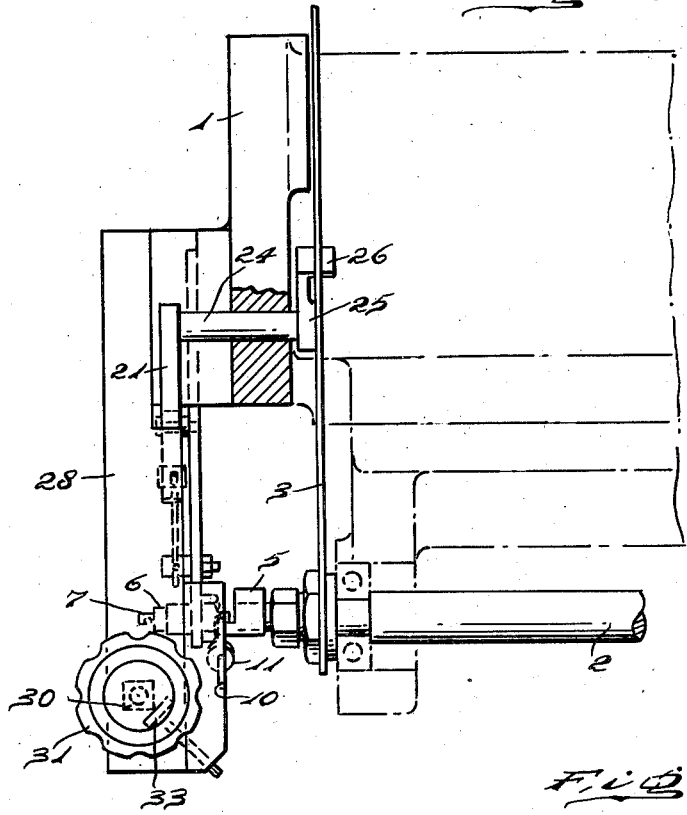
Figure 2 is an end elevation, partly in section.

Referring to the drawings:

An impact tester 1 of any desired or conventional type has a shaft 2 on which a pendulum hammer 3 is mounted. The pendulum hammer is supported at its releasing position by a latch 4.

The indicating mechanism is actuated by an arm 5 fixed on the pendulum shaft 2. A bearing 6 for an indicator arm spindle 7 is directly in line with the pendulum shaft 2 but has no connection with it. The spindle is apertured to receive an indicator arm 8, in the form of a rod having a wire 9 freely suspended from its free end. The spindle 7 at its inner end has an arm 10 in the form of a rod fixed in an aperture in the spindle, and provided with a counterweight 11 adjustable along such arm. The actuating arm 5 is so set that it comes into contact with the arm 10 at the moment of impact and imparts its own motion to it.

The bearing 6 is slotted at one side as at 12 to permit a friction member 13, set into a friction arm 14, to contact the spindle 7. The friction arm 14 is pivoted at 15 to the frame of the impact tester. A spring 16 has one end connected to a pin 17 on the arm 14, and its opposite end is connected to an adjusting rod 34 which is in threaded engagement with a manually actuated adjusting nut 18, which, in turn, is positioned by a stud 35 on the frame of the machine.

The spring is adjusted to cause sufficient friction of the friction arm to bring the indicator arm 8 to rest at the instant the arm 5 ceases to drive it, which is at the top of the pendulum swing. A link 19 is pivoted at 20 to the friction arm 14 and the other end of the link passes through the lower end of an arm 21 having an adjusting nut 22 bearing against the arm, which latter is preferably recessed to receive the nut and prevents its turning. The arm 21 at its opposite end is fixed to a shaft 23 journalled in a bushing 24 fixed in the frame. An arm 25 has one end fixed to the shaft 23 and its opposite end is provided with the an offset portion 26 overhanging the pendulum hammer and engaged by it when the pendulum hammer is raised into its latching position.

Where an impact tester has more than one capacity, it is desirable to have a direct reading scale to suit each capacity, and such scale should be quickly and easily changeable. I have, therefore, devised a novel scale of equal length for all capacities, and provided necessary changes in the markings. 27 designates a scale fixed in brackets 28 secured to the machine frame, and having equally spaced graduations 29. A scale bar 30, rectangular in cross section and square as shown, is rotatably mounted in the brackets 28 and is provided with a handle 31 by which it may be turned to the desired position. Each face of the bar 30 has markings 32 stamped on it as required for the weight of pendulum hammer in use. The scale bar 30 is retained in the position to which it has been adjusted by a spring pressed plunger 33.

The suspended wire 9, which forms the indicator, moves across the scale, and its final position with respect thereto is dependent on the swing of the pendulum after the specimen is broken.

Figure 5:
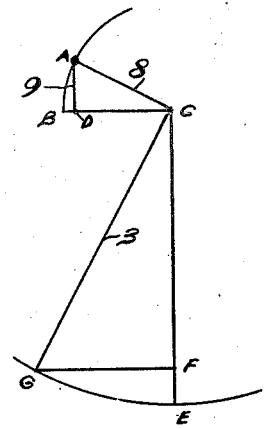
Figure 5 is a diagram showing the fundamentals of the invention.
Figure 3:
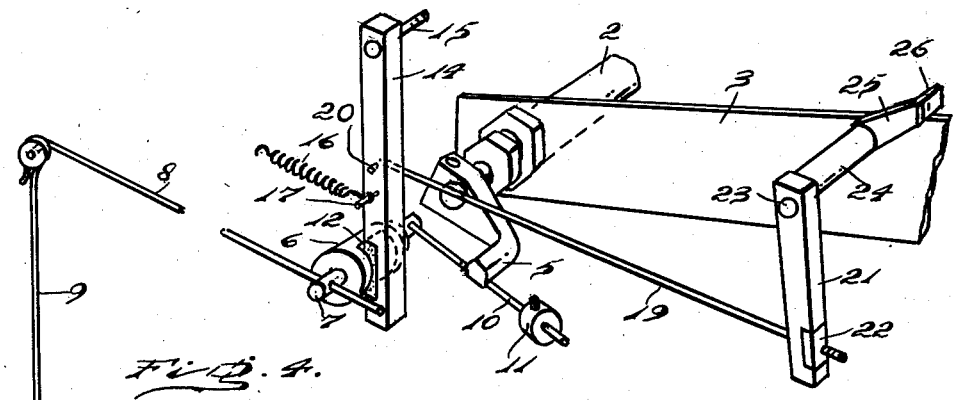
Figure 3 is a perspective view of a portion of the indicating mechanism and certain of its adjuncts.
Figure 4:
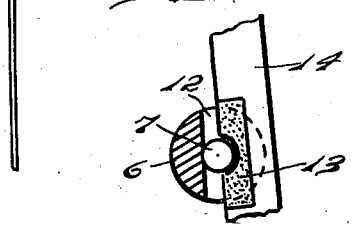
Figure 4 is a detail of friction mechanism.

The indicator wire 9 corrects for the sine of the angle of displacement of the pendulum after impact and indicates directly the vertical rise of the pendulum. This is shown in Figure 5.

In this diagram, the position of the pendulum arm 3 represents its position at the maximum height of swing after impact. The indicator arm 8 and the indicator wire 9 are shown in the positions they assume. The adjustment of the mechanism is such that the indicator arm is at right angles to the pendulum arm 3 at the moment of impact, and remains so until the pendulum has completed its forward swing. When the pendulum begins its reverse swing, the actuating arm 5 leaves the arm 10, and no further motion of the indicating arm occurs.

In the diagram, since AC is perpendicular to CG, and DC is perpendicular to CF, it follows that the angle ACD is equal to angle CGF. Therefore, all elements of the construction are similar and proportional, and BD is proportional to EF. EF represents the vertical rise of the pendulum succeeding impact, and, therefore, is a measure of the residual energy of the pendulum. The line BC may, therefore, be divided into suitable equal divisions and use as a measure of the residual energy.

In practice, the scale is graduated from right to left so that, while the indicator moves a distance proportional to residual energy, the actual reading is the difference between initial energy and residual energy, or energy expended in the breaking of the specimen.

It is desirable to have the indicator return automatically to its starting point after a test has been made and a reading taken. This is accomplished by weighting the two arms of the indicator to provide at all positions of the indicating arm within the operating range a moment sufficient to cause the indicator arm to return to its starting point. This occurs when the pendulum hammer is raised to its starting position and engaged by the latch. At this time, the pendulum comes into contact with the arm 25 to thereby actuate the friction arm 14 to release the friction on the spindle and permit the slight unbalance of the indicator arm to return it to its starting position.

Dropping the pendulum hammer for a test, instantly restores the friction to the spindle.

The parts of the indicating mechanism are light in weight and very little energy is consumed in moving them, and the friction necessary to bring them to rest is correspondingly low.

Having thus described my invention, what I claim as new and desire to secure by Letters Patent is:

1. In an indicator for impact testers, a pendulum, an indicator arm rotatably mounted, means actuated by said pendulum to cause said arm to begin to move when the pendulum reaches impact position and to thereafter rotate through the same angle as the pendulum swings beyond the point of impact, an indicator suspended from the indicator arm, and a straight line reading scale having equally spaced graduations along which said indicator moves to indicate consumed energy in the breaking of a specimen.

2. In an indicator for impact testers, a pendulum, an indicator arm rotatably mounted, means actuated by the pendulum to cause said arm to begin to move when the pendulum reaches impact position and to thereafter rotate through the same angle as the pendulum swings beyond the point of impact, an indicator in the form of a wire freely suspended from the indicator arm, a friction brake to bring the indicator arm to rest at the top of the pendulum swing beyond the point of impact, and a straight line reading scale having equally spaced graduations along which said indicator moves.

3. In an indicator for impact testers, a pendulum, an indicator arm rotatably mounted, means to cause said indicator arm to rotate through the same angle as the pendulum swings beyond the point of impact, an indicator suspended from said indicator arm, a friction brake to bring the indicator arm to rest at the top of the pendulum swing beyond the point of impact, means actuated by the pendulum to release said friction brake when the pendulum is returned to its starting point, the friction of said brake being restored when the pendulum is dropped for a test, and a scale along which the indicator moves to indicate the swing of the pendulum after a specimen is broken.

4. In an indicator for impact testers, a pendulum, an indicator arm rotatably mounted, means actuated by the pendulum to cause said arm to begin to move when the pendulum reaches impact position and to thereafter rotate through the same angle as the pendulum swings beyond the point of impact, an indicator suspended from the indicator arm, and a scale along which said indicator moves, said scale including a bar movably mounted and having a plurality of faces with different markings for different weights of pendulums, and having a spring pressed plunger to lock the bar in the position to which it has been adjusted.

5. In an indicator for impact testers, a pendulum, an indicator arm rotatably mounted and having within its operating range a moment sufficient to cause it to return to its starting point, means actuated by the pendulum, to cause said indicator arm to begin to move when the pendulum reaches impact position and to thereafter rotate through the same angle as the pendulum moves beyond the point of impact, an indicator in the form of a wire having its upper end carried by said arm, and a straight line reading scale having equally spaced graduations along which the indicator moves.

6. In an indicator for impact testers, a pendulum and a pendulum shaft, a spindle in line with the center of the pendulum shaft, a contact arm fixed to the pendulum shaft, an arm fixed to the spindle and engaged by said arm beyond the point of impact, an indicator arm on said spindle and rotating through the same angle as the pendulum swings beyond the point of impact, an indicator carried by said indicator arm, and a scale along which said indicator moves.

7. The construction specified in claim 6, having in addition a friction brake controlled by the pendulum and cooperating with the spindle.

8. In an indicator for impact testing machines, a pendulum and a pendulum shaft, a spindle rotatably mounted in line with the center of the pendulum shaft, an indicator arm having one end connected with the spindle, an indicator freely suspended from the other end of said indicator arm, a counterweighted arm fixed to the spindle, an arm fixed to said pendulum shaft to contact said counterweighted arm beyond the point of impact, a tensioned brake for the spindle, and a scale along which the indicator moves.

9. The construction specified in claim 8, wherein the scale is graduated from right to left to provide a reading indicative of the difference between the initial and the residual energy, and wherein the indicator is in the form of a wire pivotally mounted on the indicator arm.

10. In an indicator for impact testers, a pendulum, an indicator arm rotatably mounted, a rectilinear scale, an indicator freely suspended from said indicator arm to correct for the sine of the angle of displacement of the pendulum after impact and movable along the scale, and means to drive said indicator arm from the pendulum so that the indicator arm is at right angles to the pendulum at the moment of impact and remains so until the pendulum has completed its forward swing.

11. In an indicator for impact testers, a pendulum, an indicator arm rotatably mounted, means to cause the pendulum to rotate said arm so that at the moment of impact it is at right angles to the pendulum and remains so until the pendulum has completed its forward swing, a scale having equally spaced graduations, and an indicator freely suspended from the indicator arm and movable along the scale to indicate the rise of the pendulum and correct for the sine of the angle of displacement of the pendulum after impact.

WILLIAM C. MORAN.

REFERENCES CITED

The following references are of record in the file of this patent:

UNITED STATES PATENTS

| Number | Name | Date |
| --- | --- | --- |
| 1,329,192 | McAdam, Jr. | Jan. 27, 1920 |
| 1,780,696 | Amsler | Nov. 4, 1930 |
| 1,981,960 | Lewis | Nov. 27, 1934 |
| 2,060,427 | Robinson | Nov. 10, 1936 |
| 2,139,527 | Sonntag | Dec. 6, 1938 |
| 2,154,066 | De Giers | Apr. 11, 1939 |
| 2,190,059 | Edwards | Feb. 13, 1940 |